United States Patent [19]

Isaacs

[11] 4,206,814
[45] Jun. 10, 1980

[54] KNIFE SLED CULTIVATOR WITH WEEDER BAR

[76] Inventor: Clifton J. Isaacs, Box 15, Rte. 2, Turpin, Okla. 73950

[21] Appl. No.: 935,249

[22] Filed: Aug. 21, 1978

[51] Int. Cl.² .............................................. A01B 39/19
[52] U.S. Cl. ...................................... 172/44; 172/63; 172/188
[58] Field of Search .................... 172/44, 63, 112, 81, 172/188

[56] References Cited

U.S. PATENT DOCUMENTS

| 1,443,245 | 1/1923 | Wolfe ..................................... 172/44 |
| 1,521,503 | 12/1924 | Bruinekool ........................... 172/188 |
| 2,862,433 | 12/1958 | Guyer .................................... 172/44 |
| 2,954,085 | 9/1960 | Roberts ................................. 172/44 |
| 3,108,642 | 10/1963 | Hunter ................................... 172/44 |
| 3,186,494 | 6/1965 | Jackson .................................. 172/44 |
| 3,815,684 | 6/1974 | Smith ..................................... 172/705 |
| 3,970,012 | 7/1976 | Jones ..................................... 172/112 |

Primary Examiner—Richard J. Johnson
Attorney, Agent, or Firm—John H. Widdowson

[57] ABSTRACT

A farm implement having a main frame; at least two carriage wheels for supporting the frame; a plurality of brackets mounted in pairs on the frame, each pair of brackets defining a sled; a plurality of knives mounted on each sled in a generally horizontal plane; a weeder bar rotatably supported by the brackets; and a hydraulic motor mounted on the frame for driving the weeder bar in a counter clockwise direction as the implement is moved in a direction whereby the carriage wheels rotate in a clockwise direction.

3 Claims, 7 Drawing Figures

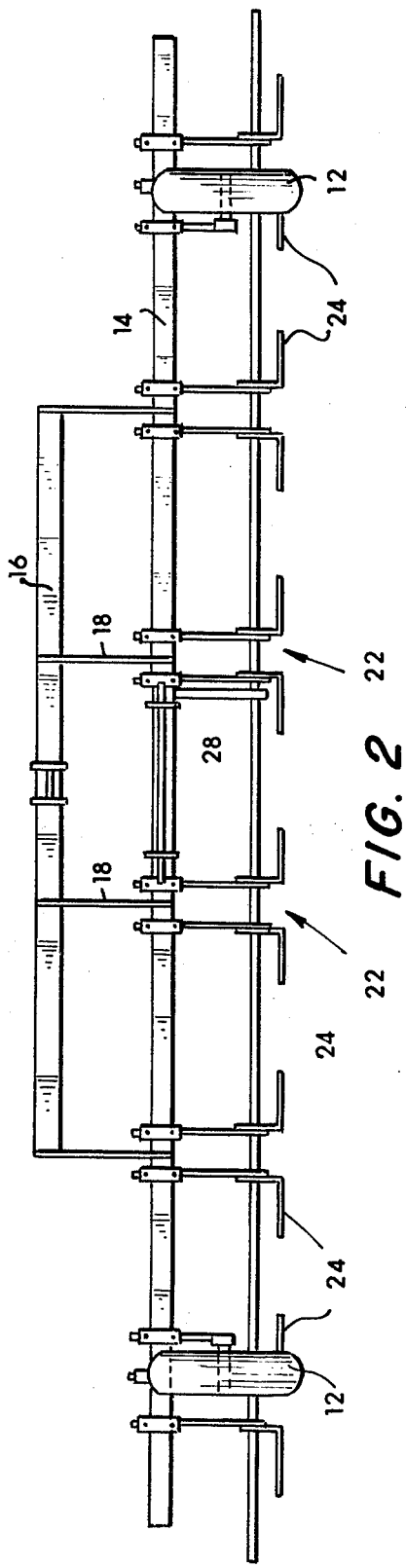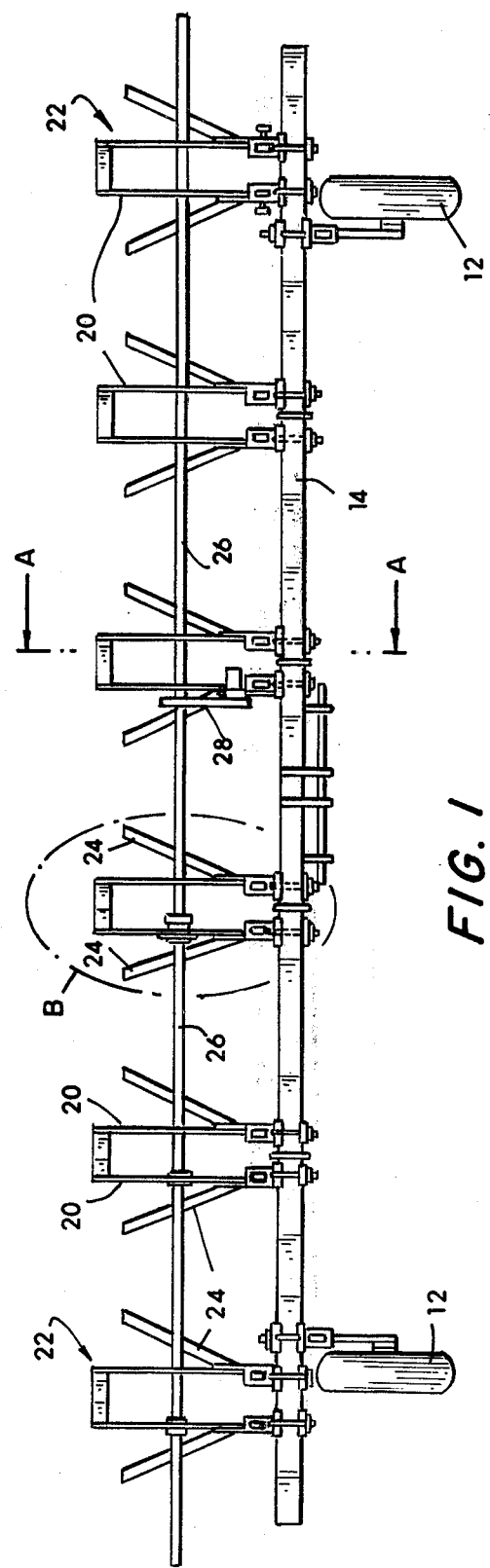

KNIFE SLED CULTIVATOR WITH WEEDER BAR

BACKGROUND OF THE INVENTION

1. Field of the Invention

The invention relates to a farm implement. More specifically, this invention provides a knife sled cultivator with a weeder bar.

2. Description of the Prior Art

U.S. Pat. No. 2,862,433, Dec. 2, 1958, M. W. Guyer, discloses a weeder bar and cultivator tool. U.S. Pat. No. 3,108,642, Oct. 29, 1963, G. D. Hunter, also discloses a cultivator tool with a rod weeder attachment. U.S. Pat. No. 1,521,503, Dec. 30, 1924, P. Bruinekool, discloses a machine for cutting weeds between rows of growing plants. None of these patents disclose a farm implement with a combination weeder bar and non-overlapping knives to effectively cultivate rowed feed.

SUMMARY OF THE INVENTION

It is therefore an object of this invention to provide a farm implement useful to cultivate field crops and to prepare soil.

It is another object to provide a knife sled with weeder bar with non-overlapping knives to prevent weeds, trash, or the like, from balling up at a point where normally knives would overlap.

It is yet another object of this invention to provide a farm implement that is effective in cultivating rowed feed in 30 to 40 inch rows, that helps keep the ground from blowing in real sandy soils and will keep that ground from blowing where the tractor tires run.

Still other objects will be apparent to those skilled in the art from the following description of this invention.

The foregoing objects are achieved according to the practice of this invention. Broadly, this invention comprises a main frame; at least two carriage wheels for supporting the frame; a plurality of brackets mounted in pairs on the frame, each pair of brackets defining a sled; a plurality of knives mounted on each sled in a generally horizontal plane; a weeder bar rotatably supported by the brackets; and a hydraulic motor means mounted on the frame for driving the weeder bar in a counter clockwise direction as the implement is moved in a direction whereby the carriage wheels rotate in a clockwise direction.

The advantages and objects of the invention will become evident from the following detailed description when read in conjunction with the accompanying drawings which illustrate the preferred embodiments of the invention:

BRIEF DESCRIPTION OF THE DRAWINGS

FIG. 1 is a top plan view of the knife sled and weeder bar;

FIG. 2 is a front elevational view of the knife sled and weeder bar;

DETAILED DESCRIPTION OF THE INVENTION

Figure 3:
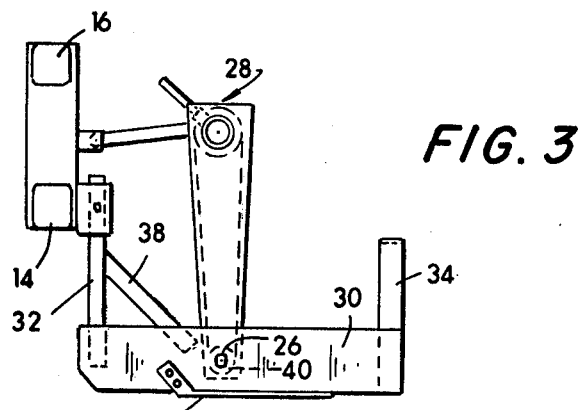
FIG. 3 is a partial transverse sectional view of the knife sled and weeder bar taken along the line 3—3 in FIG. 1 and showing the drive assembly.
Figure 4:
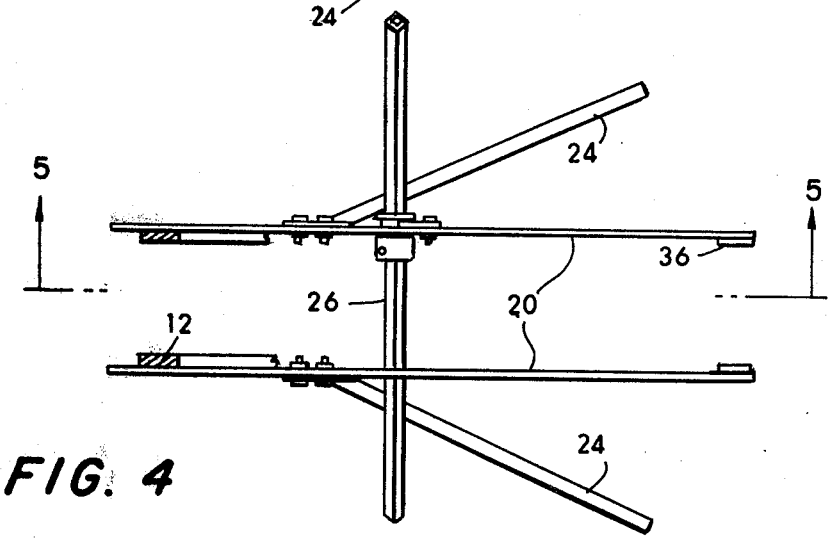
FIG. 4 is a partial top plan view from FIG. 1 showing the knives and weeder bar.
Figure 5:
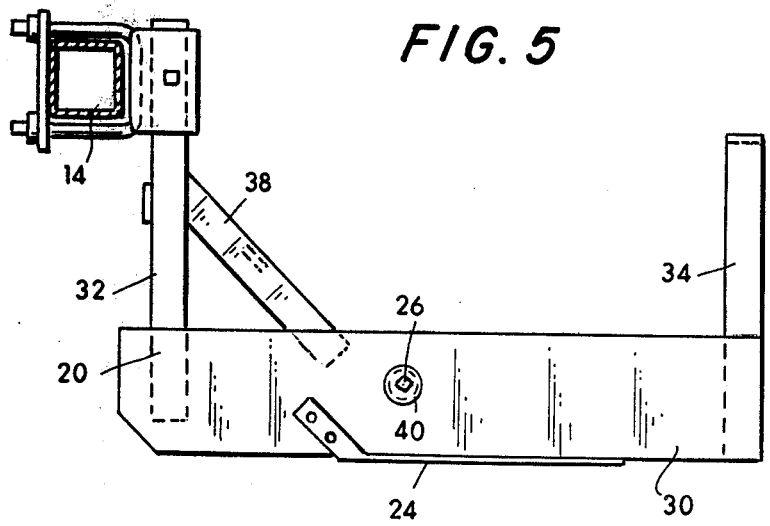
FIG. 5 is a transverse view taken along the line 5—5 in FIG. 4.

With continuing reference to the drawings, wherein similar parts are represented by like reference numerals, there is seen a farm implement, generally represented as 10, having carriage wheels 12 for supporting a frame 14 which has a bar member 16 attached thereto by attachment members 18 for connecting a tractor (not shown in the drawings) to pull the farm implement 10. A plurality of U-shaped brackets 20 are mounted in pairs on the frame 14; each pair of U-shaped brackets 20 define a sled, generally represented as 22. A plurality of knives 24 are mounted on each sled 22 in a generally horizontal plane. A weeder bar 26 is rotatably supported by the brackets 20 and is positioned above the knives 24. A hydraulic motor means, generally represented as 28, is mounted on the frame 14 for driving the weeder bar 26 in a counter clockwise direction as the implement 10 is moved in a direction whereby the carriage wheels 12 rotate in a clockwise direction.

Knives 24 protrude and are mounted on each sled 22 in such a manner whereby protruding knives 24 from adjacent sleds 22 do not overlap to prevent the balling up of weeds, trash, or the like, between knives 24 from adjacent sleds 22. It has been discovered that by shortening the knives 24 to approximately ¼ to ⅜ their original length which is normally fifty-one (51) inches to twenty (20) inches (depending on the size of the knife sled), weeds, trash, etc., will not accumulate between knives 24.

Each U-shaped bracket 20 of sleds 22 has a base 30, a frame attachment arm 32 attaching to frame 14, a free arm 34, a cross member 36 connecting to the free arm 34 of each U-shaped bracket 20, and a diagonal connecting support member 38 connecting to the base 30 and the frame attachment arm 32 of each U-shaped bracket 20. Knife blades 24 connect to the base 30 such as to be generally parallel to the ground and diverge with respect to the base 30, and the weeder bar 26 is rotatably supported by the base 30 of each bracket 20.

Figure 6:
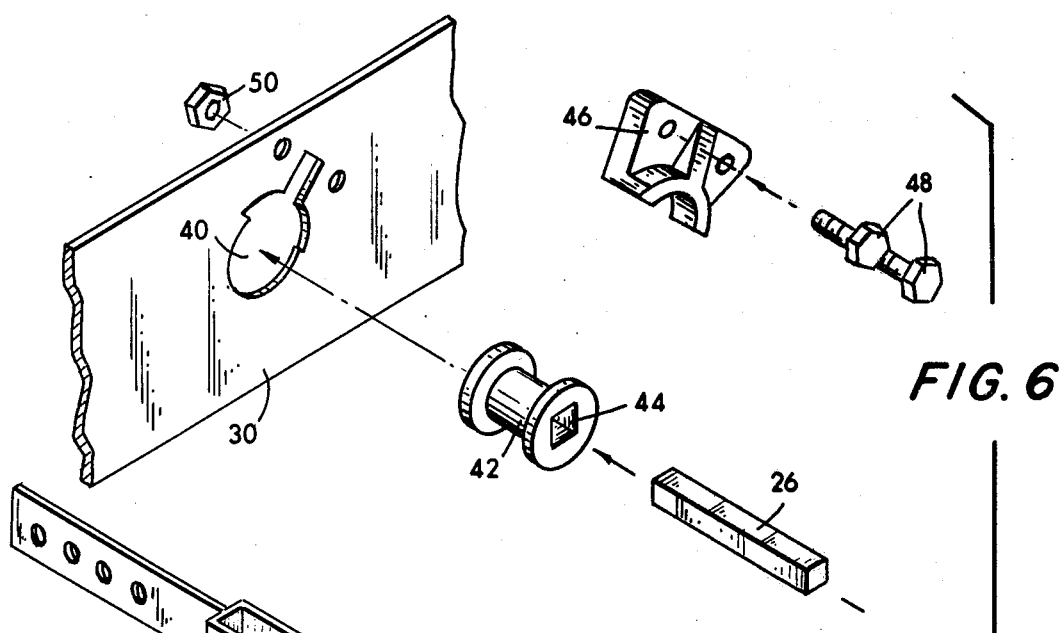
FIG. 6 is a persective view of the bearing assembly.

Each base 30 has an aperture 40 (as can be seen in FIG. 6). A spool bearing 42 having a rectangular opening 44 for the weeder bar 26 to mate therewith is seated in the aperture 40. A retainer 46 mounted to the base 30 by bolts 48 and nuts 50 rotatably secures the bearing 42 in the aperture 40.

Figure 7:
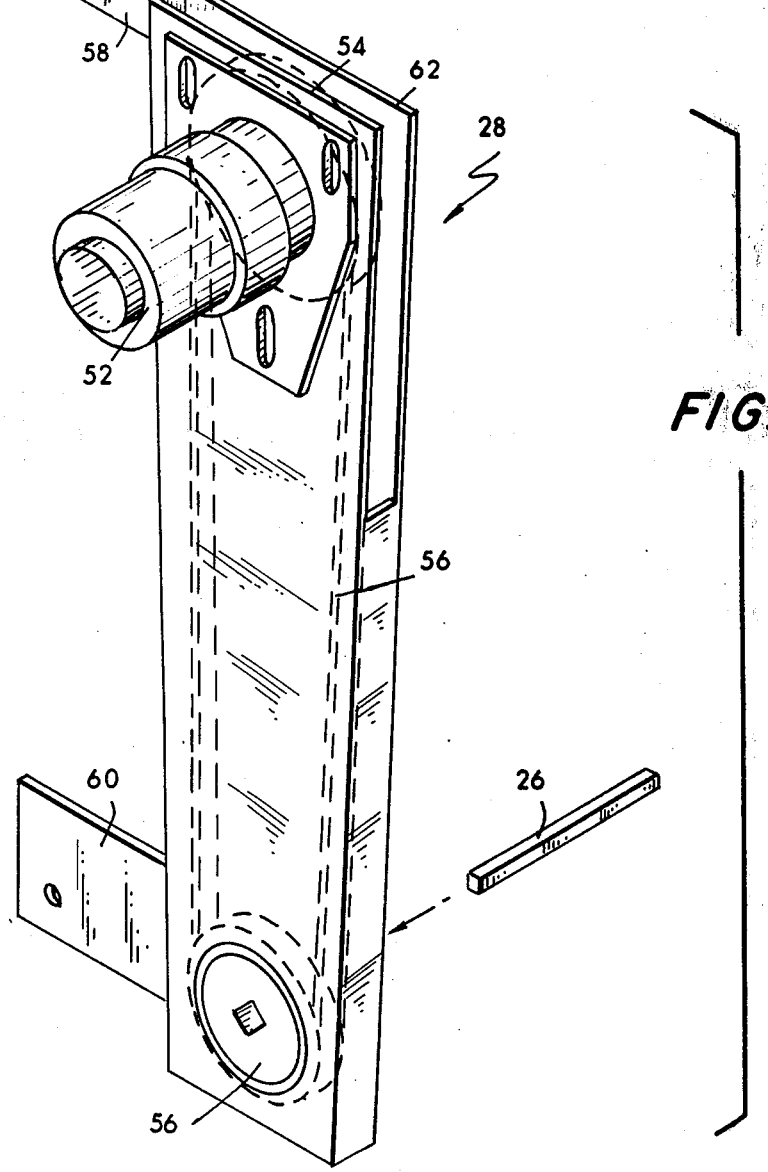
FIG. 7 is a perspective view of the drive assembly.

FIG. 7 illustrates that hydraulic motor means 28 includes a variable speed hydraulic drive motor 52 having a power take off from a tractor (not shown in the drawings) which pulls the implement 10. A drive sprocket 54 connects to the motor 52; a drive chain 56 engages the drive sprocket 54 and a driven sprocket 56 which engages the weeder bar 26 for counter clockwise rotating of the weeder bar 26. An adjustable mounting bracket 58 attaches to a drive chain housing 62 and the frame 10. A mounting bracket 60 attaches to the housing 62 and a U-shaped bracket 20 of a sled 22.

In operation of the invention, a tractor pulls the farm implement 10 such that the carriage wheels 12 rotate in a clockwise direction. The hydraulic drive motor 52 with power take off from the tractor turns the drive sprocket 54 causing the chain 56 to drive the driven sprocket 56, and the weeder bar engaging the driven sprocket, in a counter clockwise direction to knock down the stil weeds on stil ridges between stil rows. The weeder bar 26 runs underground through ridges. Simultaneous to the weeder bar 26 operation, knives 24 on sleds 22 cut weeds next to milo rows on both sides. No weeds, or the like, accumulate between adjacent knives 24 because they have been shortened as to not overlap.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A farm implement useful to cultivate field crops and to prepare soil comprising:
   (a) a main frame;
   (b) at least two carriage wheels for supporting the frame;
   (c) a plurality of brackets mounted in pairs on the frame, each pair of brackets defining a sled;
   (d) a plurality of knives mounted on each sled in a generally horizontal plane;
   (e) a weeder bar rotatably supported by the brackets; and
   (f) a hydraulic motor means mounted on the frame for driving the weeder bar in a counter clockwise direction as the implement is moved in a direction whereby the carriage wheels rotate in a clockwise direction; said weeder bar is positioned above said knives; said knives protrude and are mounted on each sled in such a manner whereby protruding knives from adjacent sleds do not overlap to prevent the balling up of weeds, trash, or the like, between knives from adjacent sleds; said sled comprises two generally U-shaped brackets, each bracket having a base, a frame attachment arm, and a free arm, said frame attachment arm attaching to said frame; at least one cross member connecting to the free arm of each U-shaped bracket; at least one diagonal connecting support member connecting to the base and frame attachment arm of each U-shaped bracket; each U-shaped bracket includes at least one knife blade connected to the base thereof such as to be generally parallel to the ground and diverge with respect to the base; said weeder bar being rotatably supported by the base of each bracket.

2. The implement of claim 1 wherein each base of said bracket has a structure defining an aperture; a spool bearing having a rectangular opening seated in said aperture; a retainer mounted to said base for rotatably securing said bearing in said aperture; said weeder bar being supported by said bearing and having a cross-section mating with said rectangular opening.

3. The implement of claim 2 wherein said hydraulic motor means comprises a variable speed hydraulic drive motor having a power take off from a tractor, or the like, which pulls said implement; a drive sprocket connecting to said motor; a driven sprocket engaging said weeder bar; a drive chain having a housing and engages said drive sprocket and said driver sprocket for counter clockwise rotating said weeder bar; a housing for drive sprocket, driven sprocket and said chain; an adjustable mounting bracket attached to said housing and said frame; and a mounting bracket attached to said housing and a U-shaped bracket of a sled.

* * * * *